July 19, 1966  J. S. GROSSINGER  3,261,964
ELECTRIC BASEBOARD HEATING SYSTEM
Filed March 10, 1965  6 Sheets-Sheet 1

INVENTOR.
John S. Grossinger
BY Webb Mackey & Burden
HIS ATTORNEYS

July 19, 1966  J. S. GROSSINGER  3,261,964
ELECTRIC BASEBOARD HEATING SYSTEM
Filed March 10, 1965  6 Sheets-Sheet 2

INVENTOR.
John S. Grossinger
BY
Webb Mackey & Burden
HIS ATTORNEYS

INVENTOR.
John S. Grossinger

HIS ATTORNEYS

July 19, 1966  J. S. GROSSINGER  3,261,964
ELECTRIC BASEBOARD HEATING SYSTEM
Filed March 10, 1965  6 Sheets-Sheet 4

INVENTOR.
John S. Grossinger
BY
HIS ATTORNEYS

July 19, 1966 J. S. GROSSINGER 3,261,964
ELECTRIC BASEBOARD HEATING SYSTEM
Filed March 10, 1965 6 Sheets-Sheet 6

INVENTOR.
John S. Grossinger
BY
Webb Burdens Robinson & Webb
HIS ATTORNEYS

United States Patent Office 3,261,964
Patented July 19, 1966

3,261,964
ELECTRIC BASEBOARD HEATING SYSTEM
John S. Grossinger, Johnstown, Pa., assignor to Crane Co., Johnstown, Pa., a corporation of Illinois
Filed Mar. 10, 1965, Ser. No. 449,353
12 Claims. (Cl. 219—365)

This application is a continuation-in-part application of my copending application Serial No. 175,146, filed February 23, 1962, now abandoned. It relates to an improved heating system, and more particularly to a closed circuit circulating liquid heating system that includes electric heating elements for heating the liquid in the circuit and also for heating air in preselected areas by the system.

The conventional heating systems most commonly used in the United States are limited, in that considerable difficulty is encountered in arranging the system to provide a uniform temperature throughout the area being heated. The conventional systems are limited, in that the heat transfer means are fixed during the installation of the system and any change in their relative position requires substantial rearrangement of the overall heating system. It is therefore the primary object of my invention to provide an improved heating system wherein a more uniform heat is obtained. A further object of my invention is to provide an improved heating system which combines the advantages of an electric heating system and a circulating liquid heating system. A further object of this invention is to provide a heating system that includes electric heating elements that serve to heat a liquid that circulates throughout the area being heated and also heat the air in preselected areas.

I have discovered that I am able to eliminate the various limitations now present in either an electric heating system or a circulating liquid heating system by combining the advantageous features of both systems in a novel manner, as will hereinafter be described. My improved heating systems includes a closed circuit conduit which circulates a fluid, such as water or the like, therethrough by means of a pump-type circulating means and a plurality of electric heating elements in heat exchange relation with the conduits. The electric heating elements are arranged to transfer heat both to the fluid which is circulated through the conduits and also to the air surrounding the heating elements. Separate control means are provided for the heating elements which may be responsive to temperatures in preselected areas and may be independent of other temperature control means. My heating elements may be the sole source of heat energy for the heating system or may be employed as an auxiliary source of heat energy to be used in conjunction with a conventional circulating liquid type heating system. My improved heating system has greater flexibility than other known systems, in that the heating elements may be positioned at preselected locations within the area to be heated so that more uniform heat distribution is obtained. In addition, the control means for my improved heating system can be so arranged that a rapid compensation for changes in outside temperature may be provided.

One of the principal features of my improved heating system is the electric heating element which transfers heat therefrom to both the liquid in the conduit and the surrounding air. The heating element comprises an electric resistance element that is preferably wrapped in special fashion around the conduit. The control means for the heating element is a temperature responsive device such as thermostat or the like which energizes the heating element to provide the desired amount of heating energy for both the liquid in the conduit and air surrounding the heating element. Conventional heat-distributing members are associated with the conduit and positioned in preselected areas to transfer the heat in the liquid to the surrounding air. With my system, I now employ the heating elements as a means to both heat the surrounding air and also to heat the liquid in the conduits. The liquid heated by the heating elements transfers heat to the air in other preselected sections of the room by means of convention heat-distributing members.

Another feature of my invention is to provide components that can be easily installed, readily removed, and replaced without disrupting to any great extent the heating system as a whole. Further, because of the heat-exchange relation between the heating element and the circulating liquid, an added advantage provided by my invention is that the elements do not become overheated to such a degree as to be capable of injuring persons inadvertently contacting the heating element. A separate control means is also provided in my heating system to de-energize the electric heating elements when the temperature of the heating elements exceeds a predetermined temperature. This control provides an independent safey device to prevent overheating of the electric heating elements.

In the accompanying drawings to be taken as a part of the specification, there is clearly and fully illustrated a preferred embodiment of this invention in which drawings.

Figure 1:
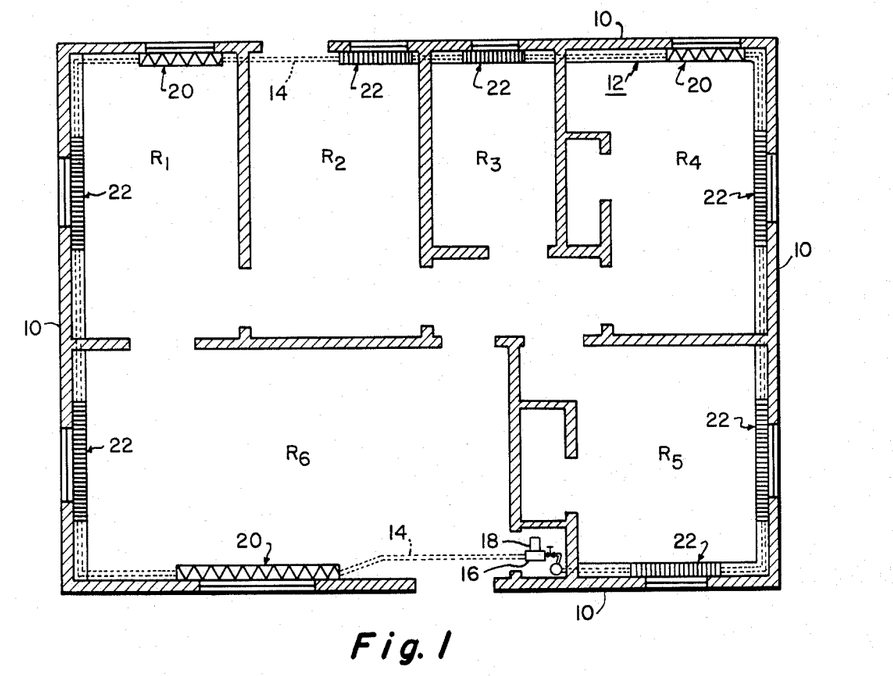
FIGURE 1 is a schematic plan view of a typical residential dwelling illustrating my improved heating system with the electric heating elements and the hydronic heat-distributing members for transferring the heat from the liquid in the conduits to the surrounding air.

Referring to the drawings, and particularly to FIGURE 1, there is illustrated a typical residential dwelling having rooms R1, R2, R3, R4, R5 and R6. Arranged along the outer walls 10 within the building there is a baseboard heater generally designated by the numeral 12. The baseboard heater 12 includes a closed circuit conduit 14 which extends completely around the dwelling adjacent the outer walls 10 and is suitably enclosed in a metallic baseboard arrangement. The conduit 14 is arranged as a closed circuit and is filled with a suitable fluid such as water. Connected in the closed circuit is a pump 16 having a motor 18. The pump 16 is arranged to circulate the water through the closed circuit conduit 14 at a predetermined velocity.

In FIGURE 1 there is not illustrated any source of auxiliary heat other than the heating elements to be later described. It should be understood, however, that it is within the scope of this invention to include a separate heating means for the liquid in the conduit 14 such as a conventional boiler 93 or the like (see FIGURE 8). The boiler would heat the liquid to a predetermined temperature and circulate the same through the closed circuit conduit. Separate control means could be provided to control the boiler. The embodiment illustrated in FIGURE 1, however, does not include a separate source of heat other than the heating elements in order to clearly illustrate the versatility of my invention.

At preselected locations in the various rooms electric heating elements generally designated by the numeral 20 are associated with the conduit 14. For example, an electric heating element 20 is associated with conduit 14 in room R1. Another separate heating element 20 is associated with conduit 14 in room R4. Another electric heating element 20 of substantially larger size than previously described heating elements 20 is associated with conduit 14 in room R6.

Throughout the residence illustrated schematically in FIGURE 1 there is a plurality of heat-distributing members generally designated as 22 also associated with the conduit 14. For example, heat-distributing members 22 may be associated with conduit 14 in rooms R1, R2, R3, R4, R5 and R6 as illustrated. The heat-distributing members are arranged to transfer heat from the liquid in the conduit 14 to the air in the area adjacent the heat-distributing units 22. It will be appreciated from the following description of the heating elements 20 that their relative position within the selected portions of the residence is not fixed by the particular heating system. It is possible to rearrange the electric heating elements 20 within the various rooms if it is found that uniform heat distribution is not being obtained. With my heating system, the position of the heating elements is flexible to the extent that the heating elements may be associated with the conduit 14 at any detailed position within the residence.

Figure 2:
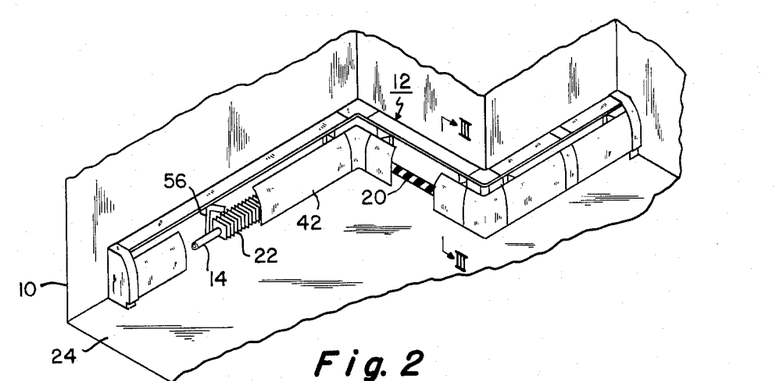
FIGURE 2 is an isometric drawing partly broken away to illustrate a continuous wall-to-wall run of a baseboard heating system including the electric heating element and the hydronic heat-distributing member.
Figure 3:
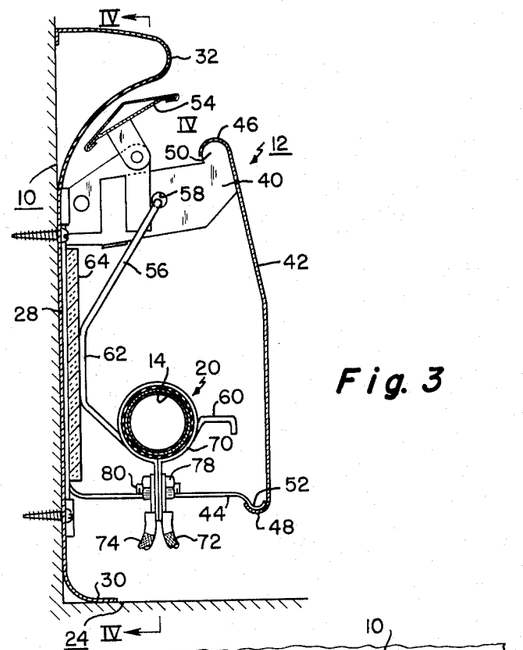
FIGURE 3 is a view in section taken along the line III—III in FIGURE 2 and illustrating in detail the arrangement of the electric heating element about the conduit.
Figure 4:
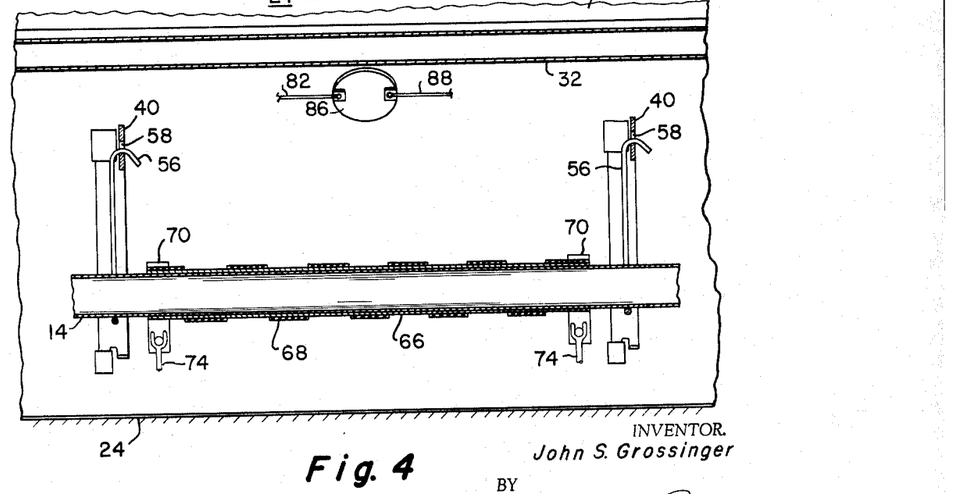
FIGURE 4 is a view in section taken along the line IV—IV of FIGURE 3 and illustrating in side elevation and section the arrangement of the electric heating elements about the conduit and the various terminals and thermostatic responsive means for the heating element.

Referring now more particularly to FIGURES 2, 3 and 4, the baseboard radiator generally designated by the numeral 12 encloses the conduit 14 at the juncture of the dwelling floor 24 and the outer wall 10. The baseboard radiator 12 includes a metallic plate or back panel 28 secured to the wall 10. The plate 28 has a lower curved portion 30 which abuts the floor 24 and an upper inwardly extending portion 32 which serves as a means to direct the convective currents of air from the room about the heating element generally designated by the numeral 20. Extending from the back panel 28 are hanger brackets 40 which are arranged to support the heating element 20, the conduit 14 and a front panel 42. A lower auxiliary bracket or arm member 44 extends from the plate or back panel 28 and serves to support the front panel 42 in spaced relation to the back panel 28. The front panel 42 has an upper inwardly curved portion 46 and a lower inwardly curved portion 48 which mate with respective ears 50 and 52 on upper and lower brackets 40 and 44. In this manner, the front panel 42 is easily secured to and removed from the brackets 40 and 44.

A damper member 54 is pivotally secured to upper bracket 40 and serves to deflect away from the wall 10 air circulated between front and back panels 42 and 28 respectively.

A hanger 56 is secured at its upper end in an aperture 58 in bracket 40 and has a lower portion 60 that supports the conduit 14 and heating elements 20 in spaced relation with the floor 24. The hanger 56 has an intermediate portion 62 which rests against insulation 64 secured to the inner surface of back panel 28 and maintains the conduit 14 and heating element 20 in spaced relation between panels 28 and 42.

Figure 5:
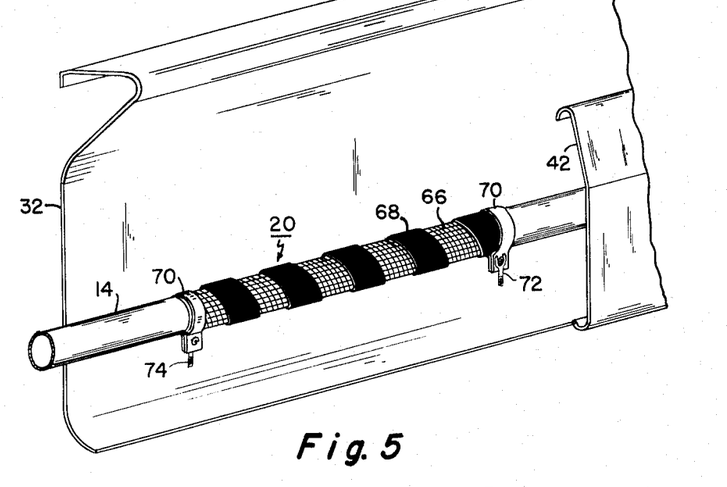
FIGURE 5 is a view in perspective of the electric heating element illustrated in FIGURES 2, 3 and 4 with a portion of the front panel removed.

In FIGURE 5, the heating element generally designated by the numeral 20 is illustrated in detail. The heatnig element 20 is preferably constructed of flexible electric resistance elements 68 spirally wrapped around the conduit 14. Positioned between the conduit 14 and the resistance element 68 is an insulating covering 66. Suitable resistance elements incorporating insulating means can also be used. The ends of the resistance elements 68 are connected to suitable wire connectors 70. Terminals 72 and 74 extend from connectors 70 and provide a means for connecting the resistance elements to suitable source of electric current.

Referring again to FIGURE 2, a conventional finned type heat-distributing member 22 is illustrated in heat exchange relation with conduit 14.

Figure 7:
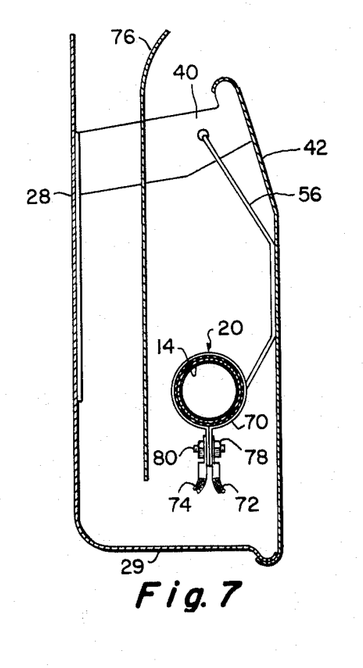
FIGURE 7 is another embodiment of the arrangement of my heating element in a baseboard.

In FIGURE 7 there is illustrated another embodiment of a baseboard heat-distributing system and the arrangement of the heating element 20 within the baseboard heat-distributing system. Since certain portions of the baseboard heat-distributing system illustrated in FIGURE 7 are similar to those illustrated in the other embodiment shown in detail in FIGURE 3, similar numerals of reference will be employed where applicable. The baseboard illustrated in FIGURE 7 has a back panel 28 and a front panel 42. The back panel 28 has a lower outwardly extending flanged portion 29 which serves as a lower support means for the front panel 42. The front panel 42 and back panel 28 enclose the conduit 14 and heating element 20. The bracket 40 is similar in construction to the bracket illustrated in FIGURE 3 and supports the upper portion of front panel 42. The conduit 14 and heating element 20 are supported from the upper bracket 40 by a hanger 56. A baffle 76 which may be insulated with reflective material is positioned in spaced parallel relation to the rear panel 28. Air circulates down between baffle 76 and rear panel 28 and then upwardly around heating element 20. The heated air is discharged through the opening between baffle 76 and front plate 42.

Figure 6:
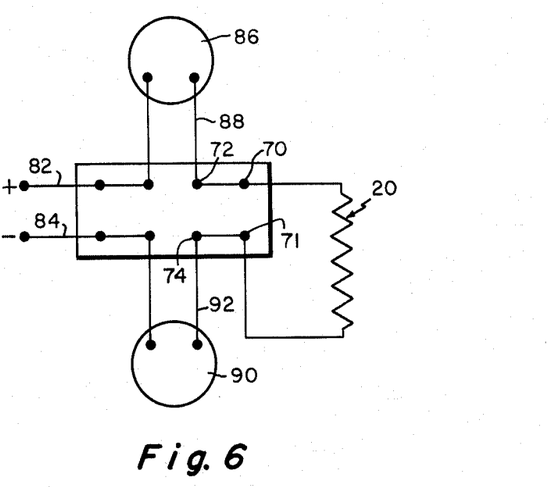
FIGURE 6 is a circuit diagram of the arrangement whereby electric current is supplied to the heating element and is controlled by means of the thermostatic devices.

The terminals 72 and 74 are secured to the connectors 70 by conventional securing means such as nuts 78 and thread bolts 80. Referring now to FIGURE 6, there is illustrated an electric circuit for the heating elements 20. The circuit includes a source of electricity which is connected through wires 82 and 84 to the electric heating element 20. Wire 82 is connected to a thermostatically operated safety switch 86 which may be of conventional construction. The safety switch 86 is positioned in the immediate vicinity of heating element 20 (see FIGURE 4) so that it is responsive to the heat of the heating element. The purpose of the thermostatic safety switch 86 is to maintain the temperature of the heating element below a predetermined temperature. When the temperature of the heating element exceeds a given temperature, the switch 86 is opened, thus controlling the electric circuit. The thermostatic safety switch 86 is connected by wire 88 to the connector 70 of heating element 20 through terminal 72. In FIGURE 6 the electric heating element is illustrated schematically as a conventional resistance element.

The other end of the heating element 20 is connected through connector 71 to terminal 74. A thermostatic device 90, such as a room thermostat or the like, is connected in series with the resistance element 20 by wire 92 and to the source of electricity by wire 84. The thermostatic device 90 may be positioned in the room at a point remote from the heating element 20 and is constructed to energize the heating element 20 when the temperature of a preselected area decreases below a predetermined temperature.

Figure 8:
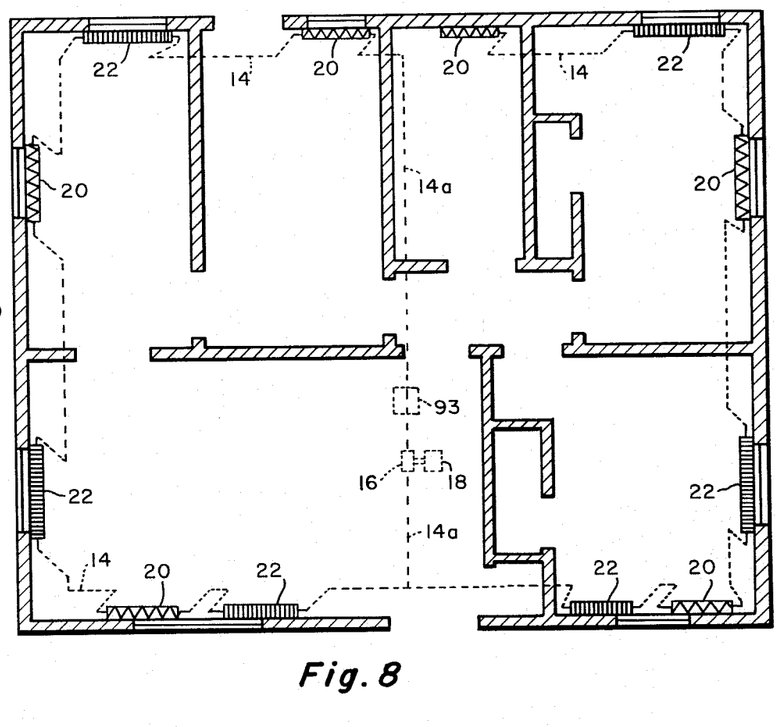
FIGURE 8 is a schematic plan view similar to FIGURE 1 showing my improved heating system in conjunction with a heating system having a conventional boiler.
Figure 9:
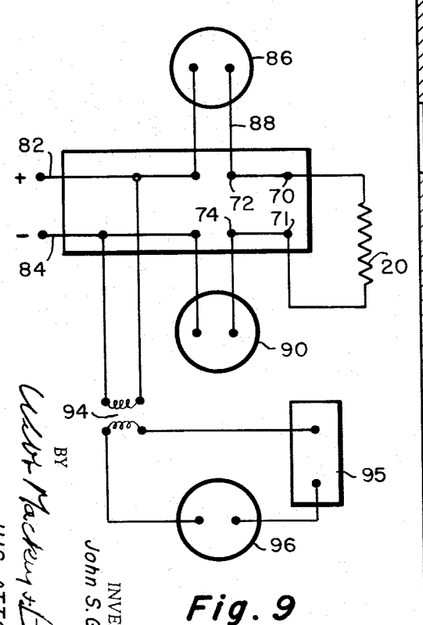
FIGURE 9 is a circuit diagram of the arrangement and whereby electric current is supplied to the heating element and it and the boiler are controlled by means of thermostatic devices.

FIGURE 9 shows the control circuit for the heating arrangement shown in FIGURE 8 in which a heating system embodies a heating element 20 and a separate boiler or the like. Current from a source 82–84 passes to heating elements 20 through safety switches 86. The supply of current to the heating elements is controlled by a thermostat 90 responsive to air temperature in the zone adjacent to the heating element 20. The secondary circuit of a transformer 94 supplies current to operate a valve 95 controlling the supply of fuel to the burner 93 and this valve current is controlled by a room thermostat 96.

It will be apparent from the above description of the electric circuit as illustrated in FIGURE 6 that the heating element 20 has two control means which serve to energize and de-energize the circuit. The first control means is the thermostatic safety switch 86 which serves as a safety device and prevents overheating the heating element. The other control means is the thermostat 90 which is responsive to the temperature of the air at a remote point in the area being heated. The various controls 86 and 90 are arranged to permit the heating elements 20 to not only heat the liquid passing through the conduit 14, but also to heat the air adjacent to the respective heating elements 20.

From the above description, the flexibility of my improved heating system becomes apparent. One can select the area in which the heating elements 20 are positioned to not only heat the surrounding air, but also heat the liquid within the conduit 14. Further, one can select the respective positions of the heat-distributing members 22 to properly and efficiently transfer the heat contained in the liquid as it is circulated through the conduit 14.

Figure 10:
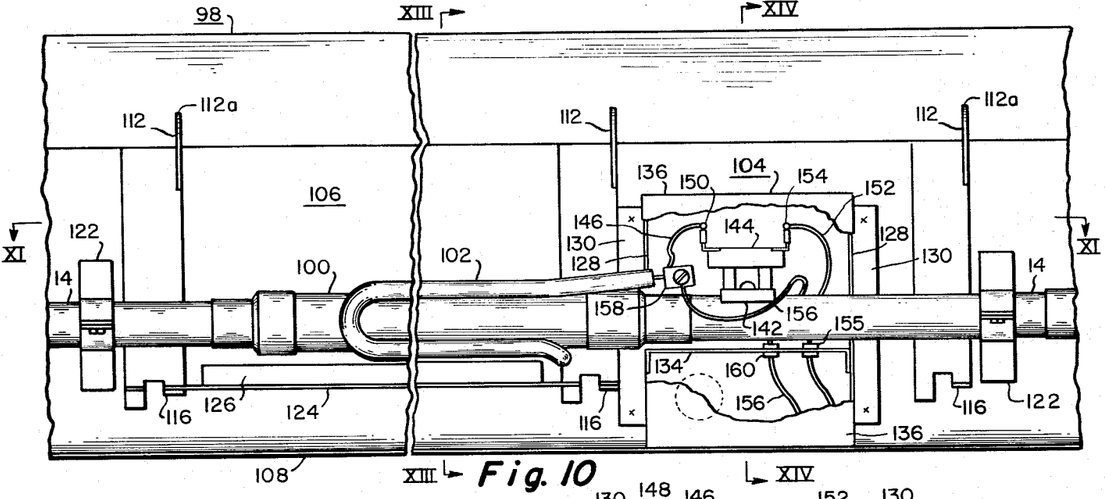
FIGURE 10 is a front elevation of a modified form of electric heating unit with a front panel removed.
Figure 11:
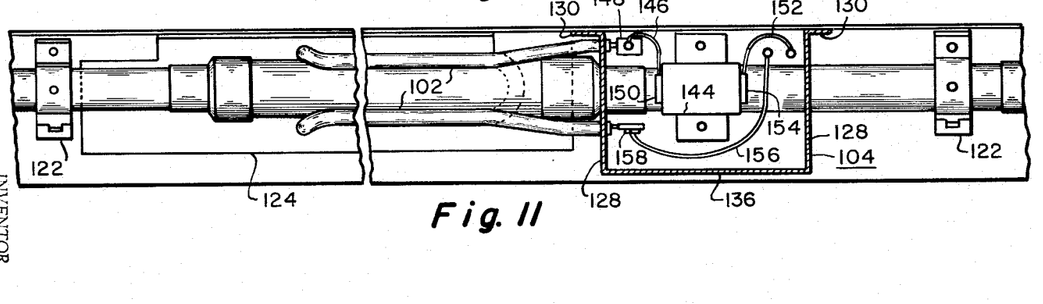
FIGURE 11 is a section along the lines XI—XI of FIGURE 10.

FIGURES 10 and 11 show a modified form of an electric heating unit which can be used in my electric heating system. The unit fits upon the conduit 14, and it is enclosed in a baseboard enclosure designated generally by the reference number 98. As shown in FIGURES 10 and 11, a portion 100 of the conduit within the enclosure 98 is increased in diameter to increase its effective heating area and this enlarged portion carries an electric resistance heating element 102 which is supplied with electricity through connections within a junction box 104.

The electric resistance heating element 102 comprises a copper tube within which is a nickel-chromium resistance wire separated from the inside surface of the tube by a dielectric material having high thermal conductivity such as magnesium oxide. The magnesium oxide conducts heat generated by the resistance wire to the copper tube and at the same time electrically insulates the resistance wire from the inside surface of the copper tube.

Figures 15, 17:
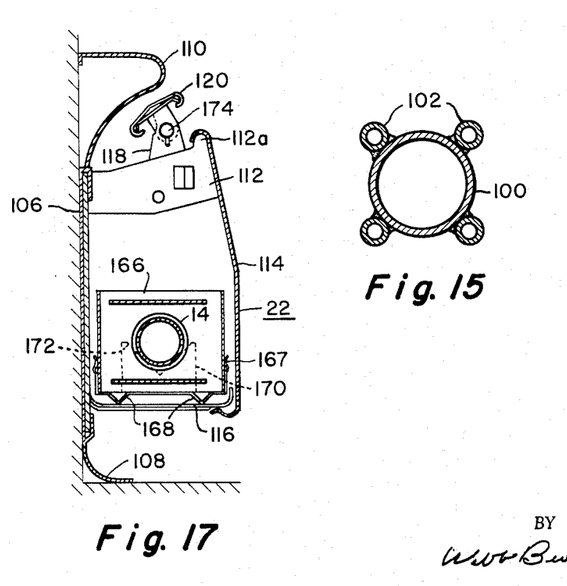
FIGURE 15 is a typical section along a conduit and electric resistance element forming part of the heating unit shown in FIGURES 10 and 11 but on a scale larger than that used in FIGURE 13.
FIGURE 17 is an end view of an enclosure for a heat-distributing member used in my heating system.

The heating element 102 extends from the junction box 104 along the length of the portion 100 of the conduit, and near the end of the portion 100 away from the box, is reversed to extend back towards the box; it then passes under the portion 100 back to the opposite end, and then back to the junction box 104 so that there are four lengths of heating element in contact with the portion 100. As shown in FIGURE 15, the outer copper tube of the heating elements is held in intimate contact with the outer surface of the portion 100 by soldering or brazing, thus forming in effect a solid metal wall between the interior of the heating element and the interior of the portion 100 of the conduit 14.

Figure 12:
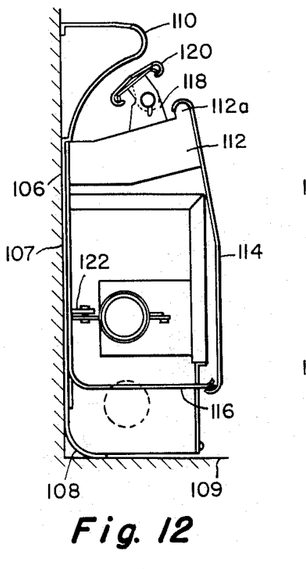
FIGURE 12 is an end view of the heating unit shown in FIGURES 10 and 11.

The enclosure for the heating unit is most clearly shown in FIGURE 12. It comprises a back panel 106 which is secured to the wall 107 of a room adjacent the floor and has a lower curved portion 108 which abuts the floor 109 and an upper inwardly curved portion 110 which deflects currents of air rising from the conduit 14 and heating element 102 into the room in which the heating unit is placed. Extending from the back panel 106 are hanger brackets 112 which supports a front panel 114. A lower bracket 116 also extends from the panel 106 and engages the bottom of the front panel 114. As shown in FIGURE 12, the upper edge of the front panel 114 is curved to hook over a projection 112a on the bracket 112, and the lower edge of the front panel is also curved inwardly to snap under the bracket 116.

A plate 118 extends upwardly from the bracket 112 and supports one end of a damper 120 which is staked in the open position shown in FIGURE 12 to deflect air rising between the panels 106 and 114 outwardly into the room.

Split brackets 122 spot-welded to the back panel 106 at each end of the heating unit support the conduit 14.

Figure 13:
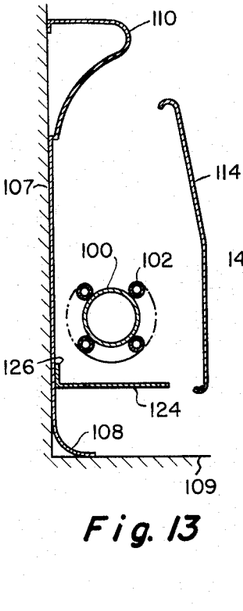
FIGURE 13 is a section along the line XIII—XIII of FIGURE 10.

As shown in FIGURES 10, 11 and 13, a radiation shield 124 extends beneath the enlarged portion 100 of the conduit 14 and the heating element 102. The ends of the shield rest on the lower hanger brackets 116, and the shield has a vertically extending leg 126 which is spot-welded to the back panel 106. This shield protects the floor from heat radiated by the conduit and the heating element 102, and it also prevents human contact from below with the outer copper tube of the electric heating unit.

The junction box designated generally by the reference number 104 comprises side walls 128 having flanges 130 which are spot-welded to the back panel 106. The sides have openings 132 through which the conduit 14 extends. A plate 134 extends between the sides beneath the conduit 14 and the box is closed by a cover 136 which is held in place by a sheet metal screw 138 threaded into a base 140. The plate 134 serves to divide the junction box into two compartments, the upper compartment being an actual junction box and the lower compartment forming an outlet box wherein electrical connections can be made to a source of electrical current.

Figure 14:
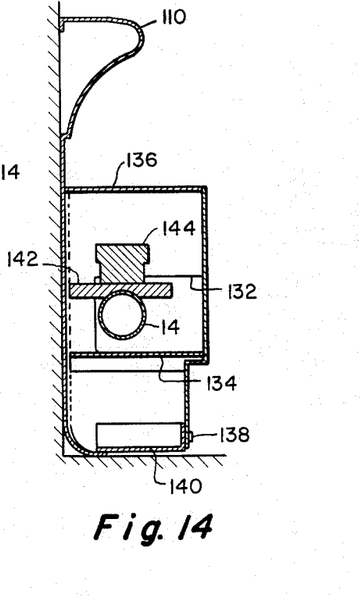
FIGURE 14 is a section along the line XIV—XIV in FIGURE 10.

Within the junction box, a copper plate 142 is machined to fit the conduit 14 and is brazed or silver soldered to the conduit as shown in FIGURE 14. The plate supports a thermostatic safety switch 144 which is provided to prevent the water temperature within the conduit from rising beyond a predetermined point and to prevent destruction of the heating element in the event circulation of fluid in the conduit 14 stops, or in the event the electric power to the heating elements is turned on when there is no water in the conduit.

FIGURES 10 and 11 show the electrical circuit for the heating element 102. A wire 146 leads from a terminal 148 of the heating element to a terminal 150 of the safety switch 144. A wire 152 extends from a second terminal 154 of the switch through a strain reliever bushing 155 into the lower compartment of the junction box which acts as an outlet box. A third wire 156 leads directly from the other terminal 158 of the heating element through a bushing 160 into the outlet box.

Figure 16:
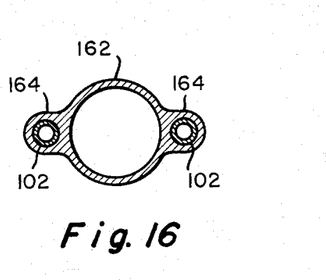
FIGURE 16 is a section similar to that of FIGURE 15 of a modified form of conduit and electrical resistance element.

FIGURE 16 is a cross-section of a modified form of a heating element. It comprises a tubular extrusion having a hollow tubular portion 162 which corresponds to the conduit 14 and smaller tubular portions 164 which are integral with the tubular portion 162 and provide passages for heating elements 102 which fit tightly within the portions 164 so that there is in effect a solid metal wall between the interior of the heating unit and the interior of the water conduit for conducting heat from the heating element into the water within the conduit.

FIGURE 17 is an end view of a conventional finned heat-distributing member 22 and its enclosure which may be used in my heating system. The member comprises a series of rectangular shaped fins 166 which (see FIGURE 2) are spaced along the conduit 14 and soldered to the conduits so that heat from water in the conduit will be conducted effectively to the fins. The fins in turn transfer the heat flowing upwardly past them within an enclosure for the fins.

The enclosure for the heat distributing member is substantially the same as that provided for the heating unit and, therefore, the same reference numbers used in describing FIGURE 12 are also used in FIGURE 17 where applicable. The enclosure for the heat-distributing member differs in two respects from the enclosure for the heating unit. First, the lower support bracket 116 carries a slide cradle 166 which extends across the bottom and part way up the sides of the end fins of the heat-distributing member, and has feet 168 which rest on the bracket 116. The cradle also has a plate 170 which extends upwardly between the first and second fins at the ends of the heat-distributing member and has a notched top 172 in which the conduit rests. The second difference between the enclosures is that the damper 120 is adjustable by rotating it about a pin 172 carried by the plate 118 so that the amount of air flowing through the enclosure can be varied.

As was described with reference to FIGURE 1, all of the heating members 20 and the heat distributing units 22 are in a single closed circuit, and each heating unit is controlled by a thermostat positioned in the zone in which the heating unit is positioned. The result is that all of the thermostats jointly control the temperature of the water in the circuit and thereby the temperaure of all of the zones heated by the circuit. If, because of local conditions in one zone, the temperature of the zone drops below that of the other zones, the thermostat in that zone will energize a heating unit positioned in that zone and this, of course, will add heat to the other zones through fluid in the common conduit 14 and possibly cause the thermostats in the other zones to cut off the supply of current to heating units in those other zones. If the temperatures in these zones drop below a predetermined point, the thermostats will cut in again. The net effect is that all of the thermostats cooperate to control the heating units so that there is compensation for all heat losses in the system.

Experience has shown that it is most unlikely that two or more heating units will be energized or de-energized at the same time and only as many heating units are energized as are required to compensate for heat losses, thus making the temperature control for the circuit a proportional type of control. The important result is that all of the current required to heat all of the circuit is not turned on or off at one time and, therefore, elaborate sequence controls to prevent surges of power which are required on conventional electrical systems can be avoided.

If it is desired to maintain the temperature of a particular zone at a temperature different from the temperature of the balance of the zones in a circuit, the dampers on the enclosure for the heat distributing members can be adjusted to provide for more or less flow of air through the enclosures and the thermostats are correspondingly adjusted. It should be understood, however, that my heating system is not intended to provide individual room control. This type of control is used in buildings such as motels or hotels where all the doors of the rooms remain closed. My system is intended for residences in which there is a transfer of heat from room to room in a single circuit and in which it is often difficult to find a suitable location for a single thermostat which controls the temperature of all of the rooms or areas as is done in conventional heating systems. In the conventional heating system controlled by a single thermostat, it is difficult to locate the thermostat because of variable conditions in different zones served by the heating system, such as the presence or lack of windows, and because of variable outdoor conditions such as wind direction and sunshine. In my heating system, the average input is proportional to the heat necesesary to maintain the required water temperature in the circuit and thus assure that the heat loss of a particular zone is compensated. The heat distributing members are located in each zone served by a circuit and sized in proportion to the heat losses which can be expected to occur in that zone. Preferably, the capacity of all of the heat-distributing members at a predetermined fluid temperature in one system is at least equal to the heat input capacity of all of the electric resistance heating elements in that system.

FIGURES 1 and 8 show a single heating circuit for all of the rooms of a house. However, two or more circuits can be used for one house. For example, one circuit could be used to heat the living quarters of a house and another circuit the sleeping quarters, and these two circuits could be maintained at different temperatures, the sleeping quarters being at a lower temperature than the living quarters.

The particular construction of my electric heating unit and the use of such a member with a conventional heat-distributing unit positioned downstream of the heating unit produces important results. In a prior conventional electric baseboard heater using fin type heat distributors, the maximum heat output possible varies from 170–250 watts per linear foot of baseboard. If these figures are exceeded, high surface temperatures are created which constitute fire hazards. The output of my heating member when coupled with a heat-distributing unit can be as high as 1650 watts per linear foot. I am able to obtain such high output per linear foot because the outer copper tube of the electric heating element and the copper conduit for the water form in effect a single metallic structure, and because the heat generated is not distributed by fins mounted directly on the unit but by a separate heat distributing unit positioned downstream of the heating member. Ninety-seven percent of the heat generated by the heating element is transferred to the water and three percent to air passing by the conduit and heating element. Thereby, excessive surface temperatures in the heating unit are avoided and the heat transferred to the water is distributed by conventional finned tube heat-distributing members which can be designed to distribute the heat over a large area and thereby avoid high surface temperatures.

High heat transfer rates to water can be obtained by electric immersion heating, but this is not satisfactory in forced circulation hydronic circuits because of the pressure drop caused by the positioning of the heating elements in the path of fluid flow, the noisy operation caused by the formation of steam-water mixtures in the boundary layers, and mineral deposits formed on the surface of the immersed heaters.

An important feature of my heating system is that the same conduit passes through all the individual heating units and the individual heat-distributing members, so that all water flowing through the system flows through each of the units. Thereby the cost of material, fittings and labor is reduced to a minimum.

According to the provisions of the patent statutes, I have explained the principle, preferred construction and mode of operation of my invention and have illustrated and described what I now consider to represent its best embodiments. However, I desire to have it understood that, within the scope of the appended claims, the invention may be practiced otherwise than as specifically illustrated and described.

I claim:
1. A baseboard heating system for heating a plurality of separate zones in a building comprising,
   A. a conduit forming a closed circuit and extending through each of said zones,
   B. a pump for circulating fluid through said conduit,

C. separate electric resistance heating elements in at least two of said zones and positioned on the external surface of said conduit in heat exchange relationship therewith, D. means for supplying electric current to said resistance elements, E. a thermostatic control in each zone having a heating element and responsive to the air temperature in that zone to control the supply of current to the heating element in the same zone, F. heat distributing members spaced along said conduit in heat exchange relationship with said conduit to transfer heat by radiation and convection from said fluid in said conduit to air circulating around said members, and G. enclosures for said heating elements and conduit which direct air convection currents to flow around said elements and conduit in heat exchange relationship therewith and to flow through the zones in which said heating elements are positioned.

2. A heating system as described in claim 1 and having enclosures for said heat distributing members and conduit which direct air convection currents to flow past said heat distributing members and conduit in heat exchange relationship therewith and to flow through the zones in which said heat distributing members and conduit are positioned.

3. A heating system as described in claim 2 in which said enclosures have movable dampers for controlling the flow of air around said heat distributing members and conduit.

4. A heating system as described in claim 1 and having a central source of heat separate from said electric resistance heating elements for supplying heat to fluid in said conduit and a means for controlling said separate source of heat independently of said heating elements.

5. A heating system as described in claim 4 said last named means comprising a wall thermostat positioned in one of said zones and responsive to air temperature in that zone for controlling said separate source of heat.

6. Apparatus for a baseboard heating system adapted to extend along the walls of a building and for generating and distributing heat in a zone within which the apparatus is positioned comprising, A. building walls defining a zone to be heated, B. a conduit extending along at least one of said walls forming part of a closed circuit and being filled with liquid, C. means to circulate liquid through said conduit, D. an electric resistance heating element positioned on the exterior of said conduit in heat exchange relationship by conduction with liquid in said conduit, said conduit and said resistance heating element also being in heat exchange relationship by convection and radiation with ambient air, E. an enclosure spaced from said conduit and resistance heating element, said enclosure having openings beneath and above said conduit and electric resistance element for the flow of air past said conduit and element and into said zone for distributing heat from said conduit and element into said zone, and F. at least one heat distributing member positioned on the exterior of said conduit at a point removed from said resistance heating element, said heat distributing member being in heat exchange relationship with said conduit and the ambient air to transfer heat from said conduit to the ambient air.

7. Apparatus for generating and distributing heat as described in claim 6 and having an enclosure for said heat distributing member, said enclosure having the same external contour as said enclosure for said heating element and openings beneath and above said member for the flow of air to and from said member and said zone.

8. Apparatus for generating and distributing heat as described in claim 7 in which said enclosure for said heat distributing member has a damper for controlling the flow of air past said heat distributing member.

9. Apparatus for generating and distributing heat as described in claim 6 in which said electric resistance element comprises a metal tube bonded to the exterior surface of the conduit, a resistance wire within the tube, and dielectric material having high thermal conductivity between the wire and the inner surface of the tube.

10. Apparatus for generating and distributing heat as described in claim 6 in which said conduit has a passage for the flow of fluid, at least one additional passage having a common wall with the passage for fluid, a resistance wire within the additional passage, and dielectric material having high thermal conductivity between the wire and the inner surface of the additional passage.

11. A series loop forced hot water electric baseboard heating system for heating a plurality of zones in a building comprising, A. a tubular conduit forming a closed circuit and having a first passageway for the flow of water to be circulated and extending through each of the zones of the building, B. a pump for circulating water through said first passageway, C. a separate electrical heating element in at least two of said zones, each element comprising
  (1) means defining a second passageway,
  (2) a resistance wire within said second passageway and
  (3) dielectric material having high thermal conductivity between the wire and the inner surface of the second passageway,
  (4) the means defining said passageways being bonded together to form a metallic wall to transfer heat by conduction from said resistance wire to fluid in said first passageway, and
  (5) means to supply an electric current to said resistance wire, D. an enclosure for said conduit and said means defining the second passageway having openings above and below said conduit for the flow of air past said conduit and second passageway, E. a thermostatic control in each of said zones having a heating element, said thermostatic control being responsive to the air temperature in that zone to control the supply of current to the heating element in the same zone, and F. heat distributing members spaced along said first passageway in heat exchange relationship with the exterior of said passageway to transfer heat from said fluid in said first passageway to air circulated past said members, said heat distribution members having enclosures which direct air convection currents to flow past said members in heat exchange relationship therewith, the capacity at a predetermined temperature of said heat distributing members being at least equal to the heat being transferred from said heating elements to said fluid.

12. An electric hydronic baseboard heater comprising,

A. a conduit for the flow of liquid to be heated,

B. an elongated electric resistance heating element extending along a portion of said conduit and returning along said portion so that its ends are adjacent the same portion of the conduit, C. said resistance heating element having a metallic outer sheath and being bonded to the outer surface of said conduit to form a metallic wall to transfer heat by conduction from the heating element to the liquid in the conduit, D. an enclosure for said conduit and resistance heating element having openings above and below said conduit and element for the flow of air past said conduit and element to heat said air at the same time heat is transferred to the liquid in the conduit, E. a junction box mounted within the enclosure adjacent the ends of said heating element and surrounding said conduit,
F. electrical terminals secured to the ends of said heating element and positioned within the junction box, and
G. a thermostatic safety switch mounted on the exterior of said conduit and within said junction box for limiting the temperature rise of said conduit.

References Cited by the Examiner

UNITED STATES PATENTS

| | | | |
|---|---|---|---|
| 1,270,198 | 6/1918 | Parkhurst | 219—301 X |
| 1,355,867 | 10/1920 | Thompson | 219—341 X |
| 1,680,084 | 8/1928 | Bolsinger | 219—301 |
| 1,850,287 | 3/1932 | Murray | 219—279 X |
| 1,980,299 | 11/1934 | Smith. | |
| 2,250,330 | 7/1941 | Eastwood | 237—63 |
| 2,483,154 | 9/1949 | Rycroft | 219—341 |
| 2,509,138 | 5/1950 | Dorn | 219—341 X |
| 2,510,235 | 6/1950 | Kogel | 219—365 X |
| 2,745,941 | 5/1956 | McElhaney | 219—341 |
| 3,010,091 | 11/1961 | Sawyer. | |

FOREIGN PATENTS 285,034  9/1928  Great Britain.

RICHARD M. WOOD, *Primary Examiner.*

ANTHONY BARTIS, *Examiner.*